Figure 1:
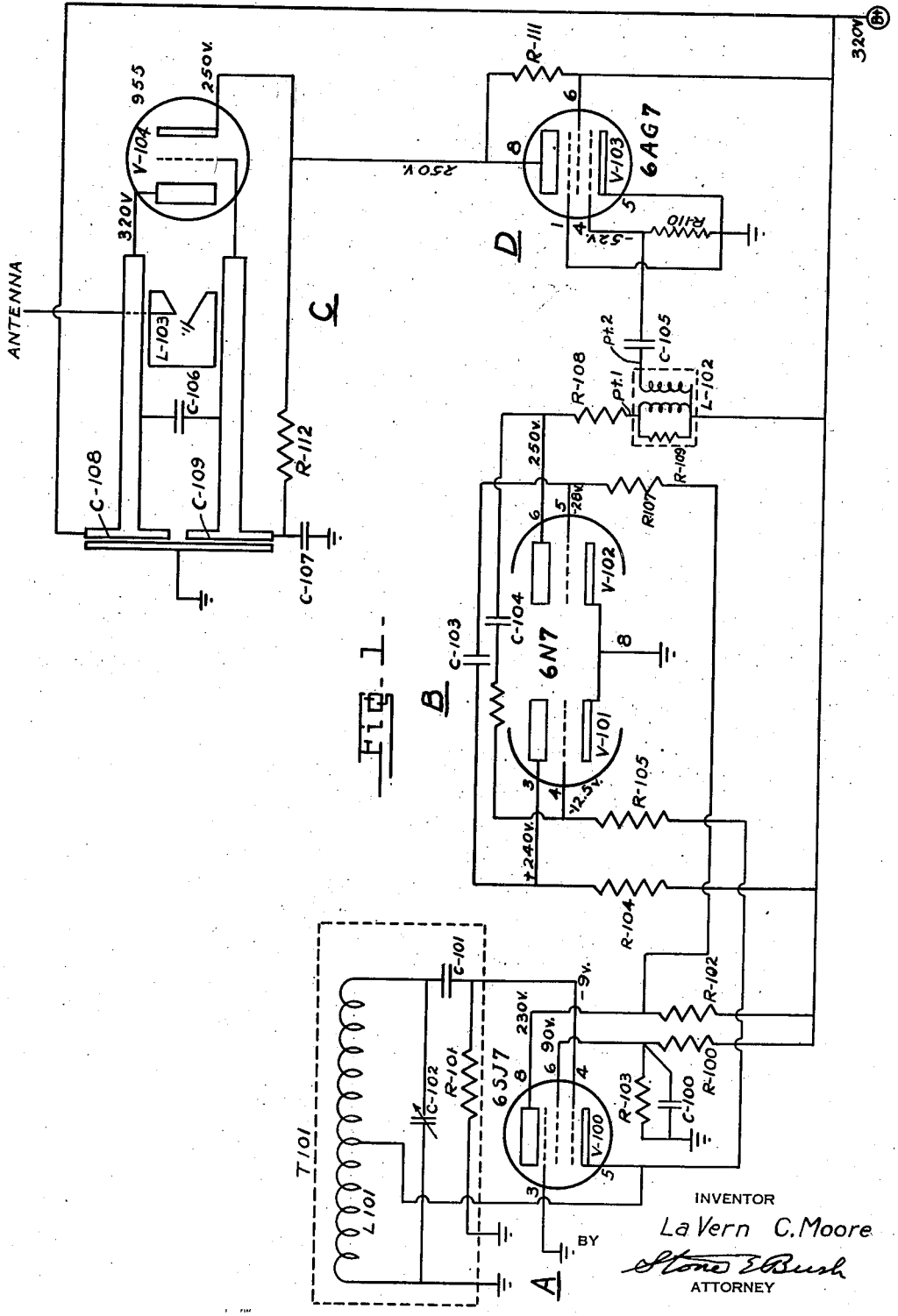

Plate (8)
246 Kc.
Oscillator

Plate (3)
Multivibrator

Plate (6)
Multivibrator

Point #1
Inductance

Grid (4)
Pulse Keyer

Plate (8)
Pulse Keyer

INVENTOR
La Vern C. Moore
BY
ATTORNEY

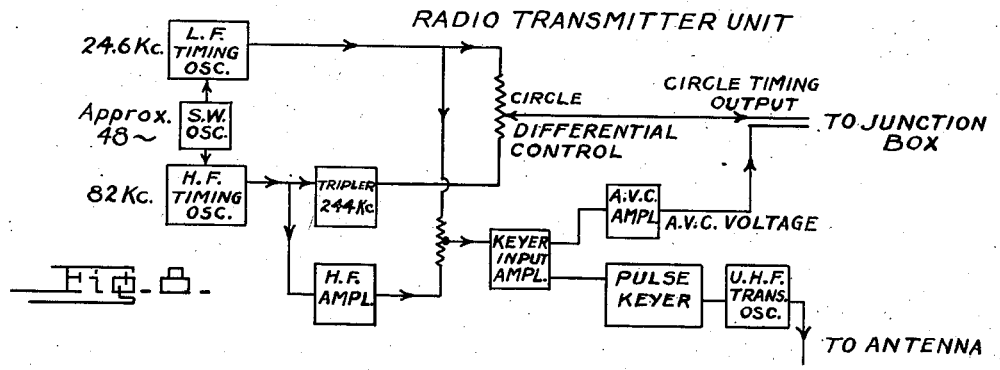
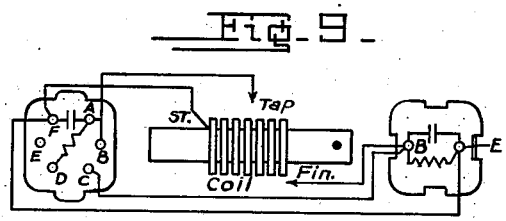
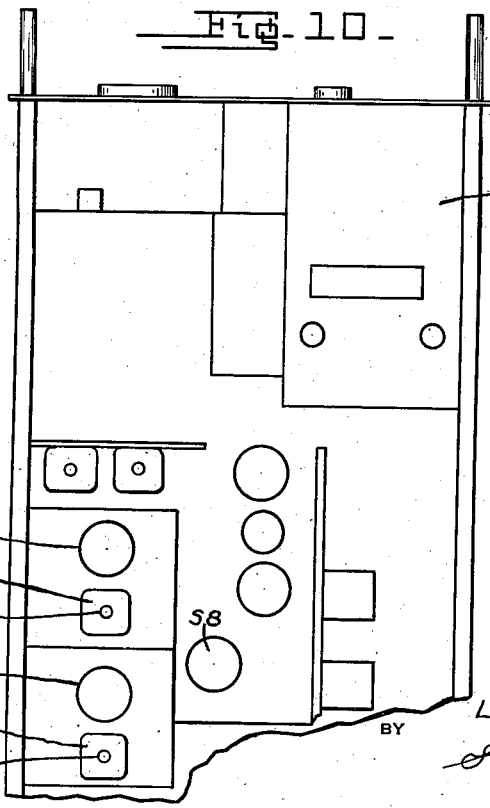

Patented Apr. 26, 1949

2,468,097

UNITED STATES PATENT OFFICE 2,468,097

RADIO ALTIMETER CALIBRATION MEANS

La Vern Carl Moore, United States Navy

Application June 9, 1943, Serial No. 490,138

4 Claims. (Cl. 343—5)

(Granted under the act of March 3, 1883, as amended April 30, 1928; 370 O. G. 757)

This invention relates to an improvement in the calibration of frequency controlled radio altimeters.

These altimeters operate on the principle of transmission of radio signal pulses, reception of their reflections from the earth's surface and measurement of the elapsed time between the transmission and the reception. The velocity of radio waves being known, this time interval may be readily translated into altitude of the aircraft in which the altimeter apparatus is installed above the earth's surface.

The method by which the principle is put into practice is as follows: A pair of circular traces is produced on the screen of a cathode ray tube at 24.59 and 245.9 kilocycles per sec, respectively, which frequencies or even fractions thereof are also used for producing the signal pulses which are caused to form pairs of blips or lobes on those traces respectively, one of the blips of each pair being formed by the direct wave pulses from the transmitter, the other by the reflected waves from the ground. The blips or lobes result from negative impulses produced by the received signal pulses being impressed on an electrode passed thru the center of the cathode ray screen. The arcuate distance between the lobes is an indication of the altitude which may be read on an appropriate circumferential scale on the screen of the cathode ray tube. The carrier frequency used may be 500 megacycles.

The equipment in one form of the above type of radio altimeter for carrying out the above functions, namely the "Navy Model AYA/AYA-1 Aircraft Radio Altimeter Equipment," includes a radio transmitter unit, a radio receiver unit, an indicator unit with a cathode ray tube, a dynamotor-filter unit, a control unit, and a junction box.

The method of calibration which has been used heretofore requires approximately five hours, with trained personnel, and necessitates removal of the equipment from the aircraft.

In the present method, relatively inexperienced personnel may be used and removal of the equipment from the aircraft is not necessary. The calibration takes only 15 to 20 minutes.

The main object of my invention is to eliminate the necessity of removing this or other similar radio altimeter apparatus from the aircraft during its calibration.

Figure 11:
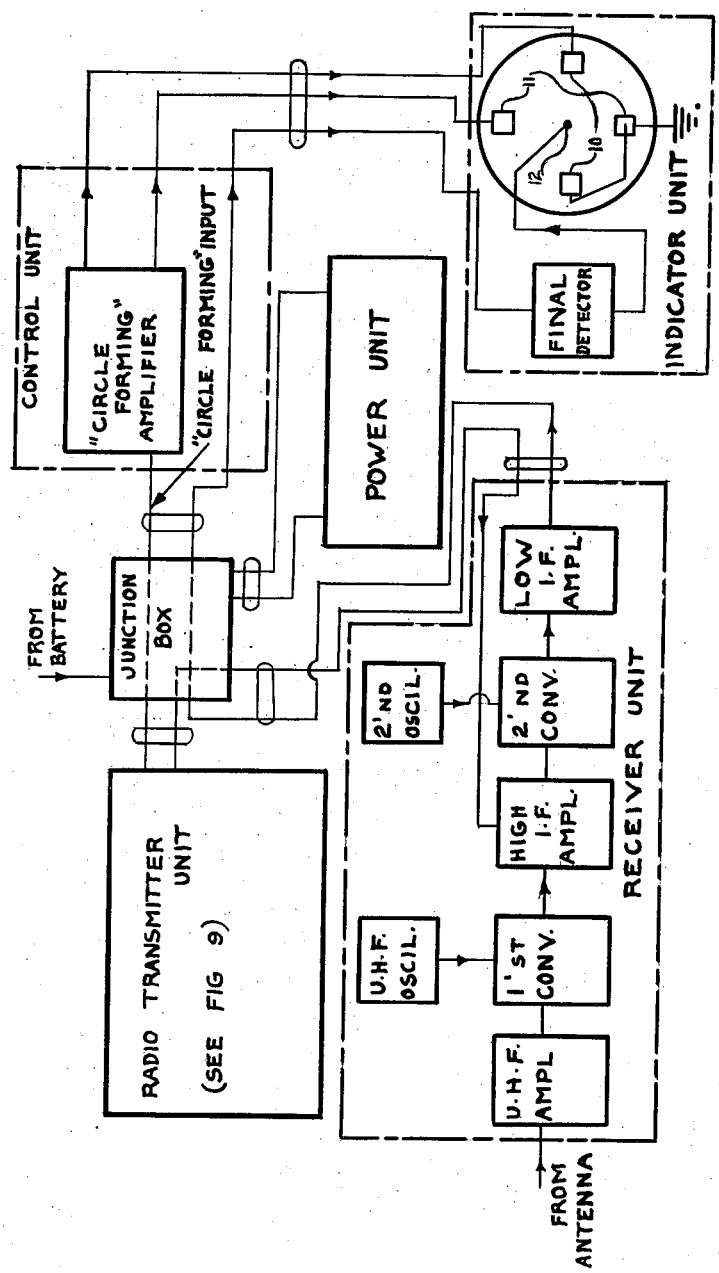

A further object is to provide a simple system for calibrating radio altimeters of this type, which will take a minimum amount of time and relatively inexperienced personnel without sacrificing accuracy. These and other more specific objects will appear as the description of my apparatus proceeds. A preferred form of my invention is shown in the accompanying drawings, in which:

Fig. 1 is a circuit diagram of the calibration system used,

Fig. 2 to 7 represent the wave forms of the voltage developed at the several points in the circuit, Fig. 8 is a block diagram of the transmitter unit of the altimeter equipment, Fig. 9 is a diagrammatic view of the transformer unit of one of the timing oscillators of the transmitter, Fig. 10 shows the relative location of the timing oscillator transformers in the transmitter unit, and Fig. 11 is a block diagram of the several units of the "AYA/AYA-1 Aircraft Radio Altimeters" as disclosed in the "Instruction Book For Navy Model AYA/AYA-1 Aircraft Radio Altimeter Equipment."

It has been customary heretofore in calibrating this type of altimeters, to remove the equipment from the aircraft and take it into the shop or laboratory. If spare junction boxes were not available, the complete wiring and cable installation would also have to be removed from the aircraft.

A crystal controlled signal generator at 122.949 kc. and a good and stable oscilloscope were required. Internal connections in the transmitter had to be made to the oscilloscope, necessitating a perfectly shielded lead. The personnel had to be trained to read and interpret Lissajous figures.

A conservative estimate for the foregoing calibration is approximately five hours, with the added disadvantage that the equipment is not calibrated in the aircraft under actual operating conditions; but has to be removed and transported to the test bench, and requires special and more complicated test equipment.

The present system requires no direct connections to the altimeter, but is placed within a reasonable distance (100 ft.) of the altimeter receiving antenna with equipment installed. No additional instruments are required, as all indications can be read on the altimeter indicator, and by relatively inexperienced personnel. It is simple in design, and all component parts are readily obtainable. The time of calibration for both traces is approximately 15 to 20 minutes.

The circuit consists of a 24.6 kc. (or any even multiple of 24.6 kc.) oscillator A, a 24.6 kc. multivibrator B, a 500 mc. oscillator C, and a 24.6 kc. pulse keyer D. The low frequency oscillator circuit (A) is similar to the low frequency timing oscillator of the altimeter transmitter. It consists of the same transformer unit T101 and 6SJ7 pentode. The output of this circuit leads to the grids 4 and 5 of the multivibrator tube, which is a duo-triode and is hooked up as shown. The multivibrator in turn is connected to the 24.59 kc. pulse keyer through the inductance L102. The output of the pulse keyer is superimposed upon the carrier generated by the high frequency oscillator C, the modulated signal being delivered to the antenna for transmission.

Figure 2:
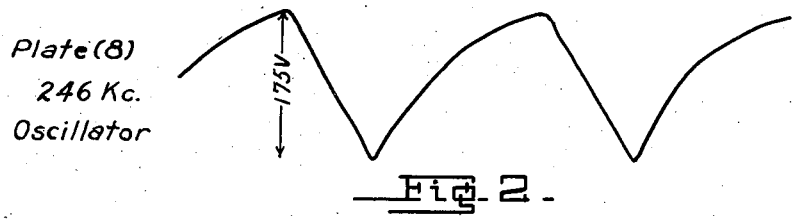
Figure 3:
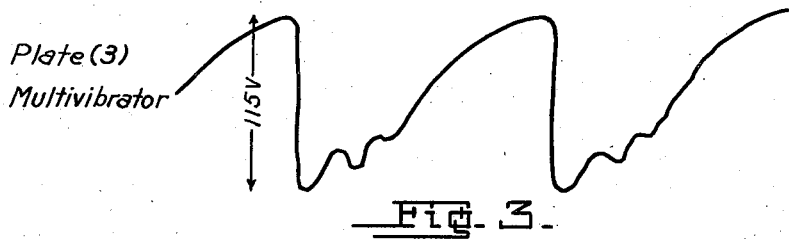
Figure 4:
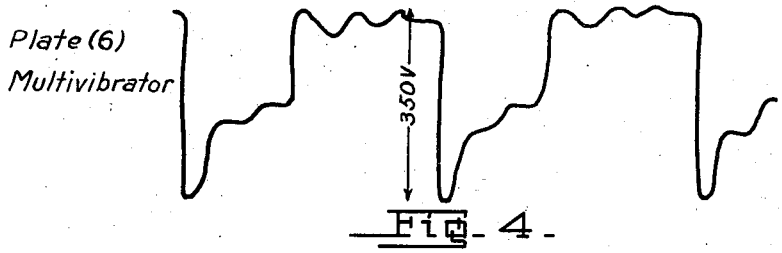
Figure 5:
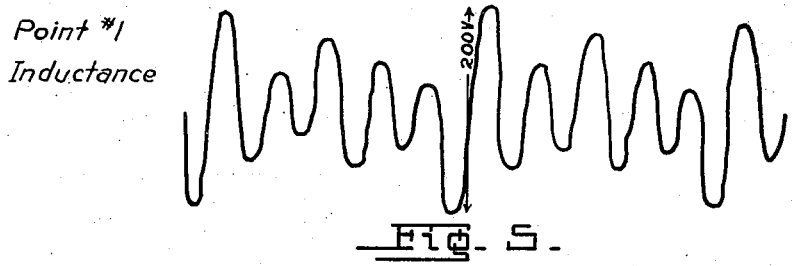
Figure 6:
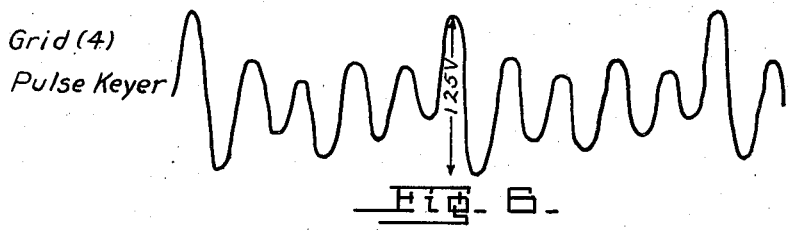
Figure 7:
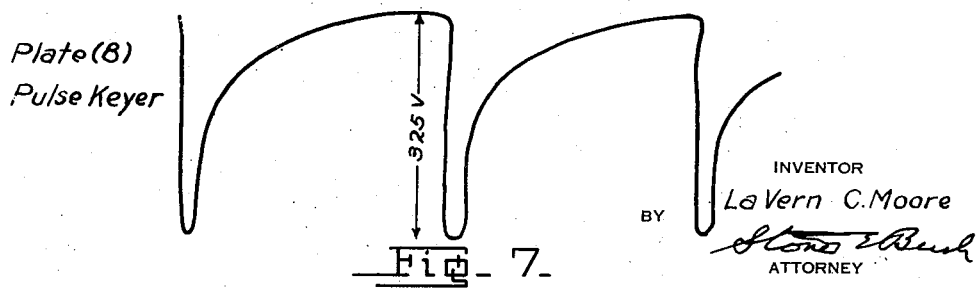

The typical wave forms of the voltages generated at the several points in the circuit are shown in Figs. 2 to 7. Fig. 2 shows the voltage variations at the plate of the 24.59 kc. oscillator; Fig. 3, those at plate 3 of the mutivibrator; Fig. 4, at plate 6 of the mutivibrator; Fig. 5, at point #1 of the inductance L102; Fig. 6, at grid 4 of the pulse keyer; and Fig. 7, at the plate 8 of the pulse keyer, whence the signal is impressed on the 500 mc. carrier of the U. H. F. oscillator circuit for transmission through the antenna of the calibrator.

The following is a list of the parts used in my calibrator, as shown in the circuit diagram of Fig. 1:

Condensers

| | |
|---|---|
| C-100 | 8 microfarads |
| C-101 | 500 micromicrofarads |
| C-102 | 3600 micromicrofarads |
| C-103 | 250 micromicrofarads |
| C-104 | 250 micromicrofarads |
| C-105 | 2000 micromicrofarads |
| C-106 | 250 micromicrofarads |
| C-107 | 10,000 micromicrofarads |
| C-108 | 100 micromicrofarads |
| C-109 | 100 micromicrofarads |

Inductances

| | |
|---|---|
| L-101 | T-101 of the altimeter equipment. |
| L-102 | One continuous center tapped coil jumble wound of #30 wire. Wound $\frac{5}{16}$" deep along the full length of a 1 megohm carbon resistor $1\frac{1}{16}$" long. |
| L-103 | Antenna loop. |

Resistors

| | |
|---|---|
| R-100 | 50,000 ohms, 1 watt |
| R-101 | 100,000 ohms, ¼ watt |
| R-102 | 50,000 ohms, 1 watt |
| R-103 | 25,000 ohms, 1 watt |
| R-104 | 10,000 ohms, 1 watt |
| R-105 | 50,000 ohms, 1 watt |
| R-106 | 100,000 ohms, ¼ watt |
| R-107 | 400,000 ohms, ¼ watt |
| R-108 | 10,000 ohms, 1 watt |
| R-109 | 1 megohm, 1 watt |
| R-110 | 1 megohm, 1 watt |
| R-111 | 50,000 ohms, 1 watt |
| R-112 | 1 megohm, 1 watt |

Tubes

| | |
|---|---|
| V-100 | 6SJ7, 24.59 kc. oscillator |
| V-101 | ½-6N7, multivibrator |
| V-102 | ½-6N7, multivibrator |
| V-103 | 6AG7, pulse keyer |
| V-104 | 955,500 megacycle oscillator |

Miscellaneous

HOOKUP WIRE AND TUBE SOCKETS

The parts of the calibrator may all be mounted in a shielded box and connected as shown in the circuit diagram. The combination is adaptable for forming a compact assembly which may be readily carried to the points of use.

Fig. 8 is a block diagram of the transmitter unit of the altimeter and shows the relation between the low frequency and high frequency timing oscillators in the circuit. The location of the parts in the transmitter assembly is shown in Fig. 10 which is a bottom view of a portion thereof. The transformer unit of the H. F. timing oscillator of the transmitter is shown diagrammatically in Fig. 9. The arrangement is the same for that of the L. F. timing oscillator, except that the shunt resistor R-111 is omitted and the values of the other resistance and the capacities are obviously different. The inductance is adjustable in either transformer.

The relation of the altimeter parts is diagrammatically illustrated in Fig. 11. The "circle forming" amplifier provides the high frequency voltages to the cathode ray deflecting plates 10 and 11, maintaining a 90° phase difference between the voltages fed to the two pairs of plates. If the voltages are at the same time kept at equal amplitudes the resulting trace on the cathode ray screen will be substantially circular. The size of the circle is determined by the amplitude of the voltages supplied. An electrode 12 is passed through the center of the screen and is connected to the final detector in the receiver circuit which receives the negative impulses directly from the transmitter and their reflections from the ground. Both the direct impulse and its reflection produce blips on the circular traces, and their angular spacing will depend on the time interval between their reception which in turn will depend on the distance of the reflecting surface, i. e., the earth's surface.

The operation of the calibrator is as follows:

After prechecking the calibrator against a frequency standard, it is placed about 100 feet away from the receiving antenna of the aircraft in which the altimeter is installed. A clear radiation path is essential. The transmitter unit of the altimeter equipment is removed from its case and inverted without removing the cable connections so as to gain access to the adjustments 101 and 104 on the inductances L1 and L4 of the transformers of the low and high frequency oscillators T1 and T3, respectively. The low and high frequency oscillators have outputs taken off at plate-tank transformers consisting of inductors L1 and L4 and associated capacitors. Adjustable cores 101 and 104 are provided the inductors L1 and L4 for the adjustment thereof. The equipment is then turned on and allowed five minutes to warm up. The negative lead from a 45 volt battery is connected to pin #4 of the 6SN7-GT tube secured in socket S8 of the switching oscillator of the transmitter, and the positive lead from the battery is grounded to the transmitter frame. This stops the inside trace. The outside trace is then calibrated by adjusting the inductance L1 in the transformer of the L. F. timing oscillator T1 of the transmitter until the blip is stationary on the trace. While the calibration transmitter is operating, the altimeter transmitter is also operating. Pulses are received by the altimeter receiver from the calibration transmitter. Next the negative lead is removed from pin #4 and fixed to pin #1 of the switching oscillator tube socket S8. This will stop the outside trace. The inside trace is then calibrated by adjusting the inductance L4 in the transformer of the H. F. timing oscillator T3 of the transmitter until the blip is stationary on the inside trace. The battery is then removed and the transmitter unit replaced in the case. The equipment is now calibrated and ready for flight.

In the above operations, the calibration of one trace is performed while the other trace is eliminated by cutting-off the current generating that trace by placing a 45 volt bias on the proper grid of the switching oscillator in the transmitting unit of the altimeter equipment. This is done to isolate either the high or the low frequency timing oscillator circuit while calibrating the corresponding circular trace to determine the accuracy of the frequency put out by the said oscillator, so as to avoid any interference from the other circuit should it not be in proper adjustment to generate the correct frequency.

The outer trace of the altitude indicator is based on a 20,000 ft. scale, while the inner trace is based on a 2,000 ft. scale, the frequency of the circuits forming the inner trace being exactly 10 times those forming the outer trace, and each frequency being such as will produce one cycle in the time it takes an electric impulse to travel from the altimeter to the earth and back at an elevation of the corresponding scale. Thus at an altitude of 2,000 ft., if the oscillator frequencies are properly adjusted, the blips formed by impulses sent out from the transmitter and by their reflections will occur on top of each other on the inner trace and will be separated by 36° on the outer trace. At 20,000 ft., the blips will fall on top of each other on both traces. At any intermediate altitudes the blips will be separated by corresponding portions of the circles and the altitude may be read as to the number of thousands of feet on the outer circle and as to the more accurate fractional portions of the 2000 ft. intervals on the inner circle, which actually provides a vernier reading on an expanded scale. The transmitter impulses are timed to occur so that the blips formed by the outgoing impulses occur at the zero readings on the two scales which are superimposed on the face of the cathode ray oscilloscope of the altimeter indicator adjacent the two circular traces. As a result the blips formed by the reflected impulses enable the direct reading of the altitude to be made on the scales, which are marked off in 500 ft. divisions on the outer scale and 100 ft. divisions on the inner scale.

The calibrator, being preadjusted to generate impulses at exactly 24.59 kc., produces them at intervals equivalent to the time required for an electric wave to travel 40,000 ft., i. e., the distance from an aircraft at 20,000 ft. to the earth and back again to the aircraft. The blips formed by such impulses should therefore occur on exactly the same point of either of the traces and form a stationary blip, provided the frequencies of the low and high frequency timing oscillators are adjusted to the correct values, which are 24.59 kc. for the outer trace and 245.9 kc. for the inner trace. If these frequencies are not accurate, the successive blips will form at successively different points on the trace which is off frequency and the blip thereon will appear to be moving around the trace. To adjust for the correct frequency in the corresponding circuit, it is therefore only necessary to watch the blip and adjust the corresponding inductance until the blip stops moving, as explained above.

Obviously, modifications may be made in the size, shape and arrangement of parts in my calibrator and method of calibration without departing from the spirit or scope of the invention as defined in the appended claims.

This invention may be made or used by or for the United States Government for governmental purposes without the payment to me of any royalties thereon or therefor.

What I claim is:

1. In a circuit for calibrating a radio altimeter using circle-forming means on the screen of a cathode ray tube and a center electrode which receives radio pulses from a transmitted wave and its reflection from the ground to form blips on the circle, indicating the altitude by their circumferential spacing; an adjustable oscillator of the standard type used in said altimeter equipment, preadjusted to operate at the frequency at which the altimeter circle-forming means are designed to operate, or at a multiple frequency thereof, a multivibrator, connections for passing the output of said oscillator through the multivibrator, a pulse keyer controlled by the multiple frequency wave from the multivibrator, after said wave has been inverted or shifted in phase by 180°, for obtaining short pulses at the original oscillator frequency, and an ultra high frequency oscillator for supplying a carrier on which said short pulses are keyed for transmission.

2. In a circuit for calibrating a radio altimeter using circle-forming means on the screen of a cathode ray tube and a center electrode which receives radio pulses from a transmitted wave and its reflection from the ground to form blips on the circle indicating the altitude by their circumferential spacing, an adjustable oscillator of the standard type used in said altimeter equipment, preadjusted to operate at the frequency at which the altimeter circle-forming means are designed to operate, or at a multiple frequency thereof, a multivibrator, connections for passing the output of said oscillator through the multivibrator, a pulse keyer controlled by the multiple frequency wave from the multivibrator, after said wave has been inverted or shifted in phase by 180°, for obtaining short pulses at the original oscillator frequency, an ultra high frequency oscillator for supplying a carrier on which said short pulses are keyed for transmission, and an antenna through which said modulated carrier is transmitted.

3. In a system of calibrating radio altimeters, of the type having an indicator in which a trace is formed with blips on a cathode-ray screen produced by pulses of a direct wave from a local transmitter and its reflection from the ground respectively, the spacing of the blips indicating the altitude; producing short radio pulses at a frequency at which the altimeter trace-forming wave generator was designed to operate, receiving these pulses, causing them to form a blip on the altimeter trace, and adjusting the frequency of the altimeter trace-forming generator until said blip stops moving along the trace.

4. In a system of calibrating radio altimeters, of the type having an indicator in which a trace is formed with blips on a cathode-ray screen produced by pulses of a direct wave from a local transmitter and its reflection from the ground respectively, the spacing of the blips indicating the altitude; producing short radio pulses at a frequency at which the altimeter trace-forming wave generator was designed to operate, receiving these pulses by the altimeter receiver, causing them to form a blip on the altimeter trace, and adjusting the frequency of the altimeter trace-forming generator until said blip stops moving along the trace, thus assuring that the frequency of the altimeter trace-forming wave generator is proper for indicating true altitude on the scale provided and designed for said frequency.

LA VERN CARL MOORE.

REFERENCES CITED

The following references are of record in the file of this patent:

UNITED STATES PATENTS

| Number | Name | Date |
|---|---|---|
| 2,266,401 | Reeves | Dec. 16, 1941 |
| 2,312,203 | Wallace | Feb. 23, 1943 |
| 2,312,761 | Hershberger | Mar. 2, 1943 |
| 2,391,411 | Goble et al. | Dec. 25, 1945 |
| 2,419,541 | De Rosa | Apr. 29, 1947 |
| 2,421,016 | Deloraine | May 27, 1947 |
| 2,425,600 | Coykendall | Aug. 12, 1947 |

FOREIGN PATENTS

| Number | Country | Date |
|---|---|---|
| 108,640 | Australia | Sept. 22, 1939 |
| 113,233 | Australia | June 2, 1941 |

Certificate of Correction

Patent No. 2,468,697.

April 26, 1949.

FRED E. WILEY

It is hereby certified that errors appear in the printed specification of the above numbered patent requiring correction as follows:

Column 2, line 52, for the words "In the" read *If the*; column 5, lines 36 and 37, strike out "heating and" and insert the same before "applying", line 37, same column; and that the said Letters Patent should be read with these corrections therein that the same may conform to the record of the case in the Patent Office.

Signed and sealed this 8th day of November, A. D. 1949.

[SEAL]

THOMAS F. MURPHY,
*Assistant Commissioner of Patents.*